US006779756B1

(12) United States Patent
Lopez

(10) Patent No.: US 6,779,756 B1
(45) Date of Patent: Aug. 24, 2004

(54) LOW-PROFILE BRAKE-IN-SPOOL AIRCRAFT ARRESTING SYSTEMS

(75) Inventor: Edmond S. Lopez, Media, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

(21) Appl. No.: 10/440,744

(22) Filed: May 19, 2003

(51) Int. Cl.[7] .................................................. B64F 1/02
(52) U.S. Cl. ............................... 244/110 A; 244/110 C
(58) Field of Search ........................................ 244/110

(56) References Cited

U.S. PATENT DOCUMENTS

| | | | | |
|---|---|---|---|---|
| 3,044,614 A | * | 7/1962 | Hanscom | |
| 3,236,479 A | * | 2/1966 | Nordtorp et al. | 244/110 R |
| 3,350,039 A | * | 10/1967 | Crater | 244/110 A |
| 3,356,319 A | * | 12/1967 | Fonden et al. | 244/110 A |
| 3,434,591 A | * | 3/1969 | Hanscom | |
| 3,497,166 A | * | 2/1970 | Girolamo | 244/110 A |
| 3,578,272 A | * | 5/1971 | Thompson, Jr. | |
| 3,695,559 A | | 10/1972 | Cruger et al. | 244/110 C |
| 3,877,660 A | * | 4/1975 | Bernard | 244/110 A |
| 4,101,100 A | * | 7/1978 | Smith et al. | 244/114 R |
| 4,102,518 A | | 7/1978 | Bernard et al. | 244/110 C |
| 4,147,317 A | | 4/1979 | Mayhew et al. | 244/116 |
| 5,042,750 A | | 8/1991 | Winter | 244/110 C |
| 6,382,869 B1 | | 5/2002 | Dickinson | 404/6 |

OTHER PUBLICATIONS

Operations Manual for the BAK–12 Energy Absorber, Engineered Systems Corporation, Sep. 1994, Cover and pp. 1–1, 1–2 and 2–1 through 2–10.

* cited by examiner

Primary Examiner—Galen Barefoot
(74) Attorney, Agent, or Firm—Kenneth P. Robinson

(57) ABSTRACT

Arresting systems attachable to a tail-hook cable or other device for aircraft arrestment may have a total height of one foot, enabling above-ground installation at the edge of a runway. Arresting tapes are provided on horizontally positioned dual tape spools in a brake-in-spool configuration. With a friction disk brake assembly enclosed within the hub of each horizontal tape spool to control tape deployment by braking spool rotation during aircraft arrestment, overall system height is reduced. By use of disposable single-use spools, requirement for a tape rewind engine and related mechanisms are avoided. Spool hubs can be keyed to the exterior of a rotatable brake assembly portion to facilitate slidable tape spool installation and replacement. Pretensioned arresting tapes on tape spools can be employed for improved tape deployment. Computerized hydraulic brake assembly activation can be employed for controlled aircraft arrestment.

29 Claims, 7 Drawing Sheets

LOW-PROFILE BRAKE-IN-SPOOL AIRCRAFT ARRESTING SYSTEMS

RELATED APPLICATIONS (Not Applicable)

FEDERALLY SPONSORED RESEARCH (Not Applicable)

BACKGROUND OF THE INVENTION

This invention relates to arresting systems usable to arrest travel of a vehicle and, more particularly, to such systems capable of arresting the travel of an aircraft, such as a tactical fighter aircraft, under emergency or other conditions.

Aircraft arresting systems have been in use for many years. Prior such systems of the present general type typically include a barrier net or tail-hook cable stretched transverse to a runway at a point along or at an end of the runway. The net or cable is attached at each end to energy absorber units positioned on opposite sides of the runway. In one form, each energy absorber unit utilizes a flexible tape wound on a reel whose rotation is controllably braked by a braking mechanism employing friction. In prior configurations, each energy absorber unit typically had a height of the order of five to six feet, so that the two units were required to be set back a considerable distance on respective sides of the runway (e.g., set back about 200 to 300 feet) or, if located closer to the edge of the runway, were required to be installed below surface grade in concrete vaults of significant depth to accommodate the height of the absorber units.

With an arrangement as described, arrestment occurs when an aircraft, which may be traveling at high speed, engages the barrier net or tail-hook cable positioned across a runway. As the aircraft tail hook engages the cable, for example, displacement of the cable in the direction of aircraft travel begins to pull the arrestment tape out of the absorber units on opposite sides of the runway. As each tape is unwound from a tape spool, it produces rotation of the tape spool about an axis of rotation aligned horizontally. Tape spool rotation is braked by a frictional or other brake unit positioned adjacent to the tape spool. In prior systems, a small gasoline engine or other arrangement may be incorporated for use in rewinding the tape after its deployment for arrestment of an aircraft.

The degree of braking may be controlled by application of hydraulic pressure for brake activation. The profile of brake application with passage of time as the aircraft first engages the system and is then brought to a stop may be computer controlled. Such control enables efficient, non-destructive arrestment of aircraft travel, without exhausting the length of arrestment tape available on the tape reel in each absorber unit. U.S. Pat. No. 5,042,750, entitled Aircraft Arresting System and having a common assignee with the present invention, describes a system utilizing computer controlled braking for effective aircraft arrestment.

Objects of the present invention are to provide new and improved arresting systems which may have one or more of the following characteristics and capabilities:

low profile, with system height of the order of one foot;

compliance with airport obstruction regulations to permit above-ground installation at the edge of a runway;

brake-in-spool configuration with a brake assembly positioned within the hub of each tape spool;

arresting tape maintained pre-tensioned on the tape spool;

tape spools configured for one-time use and replacement after an aircraft arrestment;

no rewind engine or other mechanism for rewinding of arresting tape after deployment;

system configured to enhance tape spool removal and replacement;

system enclosure configured to withstand roll-over by aircraft wheels; and system enclosure using aircraft landing mats for upper cover and lower structure.

SUMMARY OF THE INVENTION

In accordance with the invention, an arresting system, for aircraft arrestment, includes a support assembly, brake assemblies, tape spools and a coupling device. A first brake assembly is supported by the support assembly and includes a stationary portion, a first rotatable portion configured to support a first tape spool rotatable about a nominally vertical axis, and a braking mechanism to brake rotation of the first rotatable portion. A second brake assembly is supported by the support assembly in horizontally spaced relation to the first brake assembly. The second brake assembly may be of the same configuration as the first brake assembly. First and second tape spools are removably supported by the rotatable portions of the respective first and second brake assemblies. Each tape spool includes a spool hub configured to encircle and rotate with the respective rotatable portion and an arresting tape wound on the spool hub. The tape spools and rotatable brake assembly portions may be configured so that the braking mechanism of a brake assembly is within the spool hub when a tape spool is supported by a rotatable brake assembly portion. A coupling device is attached to one end of the arresting tape of each of the first and second tape spools to enable attachment to an aircraft engagement unit (e.g., a tail-hook cable) positionable transverse to a runway.

Also in accordance with the invention, a tape spool, usable in an arresting system having a brake assembly including a rotatable portion configured to support the tape spool, includes the following. A spool hub is configured to encircle the rotatable portion of the brake assembly and to be removably supported by the rotatable portion for rotation therewith. A length of arresting tape is wound on the spool hub and may be maintained in a pre-tensioned condition. The spool hub may include internal keying features configured to cooperate with external keying features of a rotatable brake assembly portion to enable slidable installation of a tape spool in fixed rotational relation to the rotatable portion.

For a better understanding of the invention, together with other and further objects, reference is made to the accompanying drawings and the scope of the invention will be pointed out in the accompanying claims.

DESCRIPTION OF THE INVENTION

Figure 1:
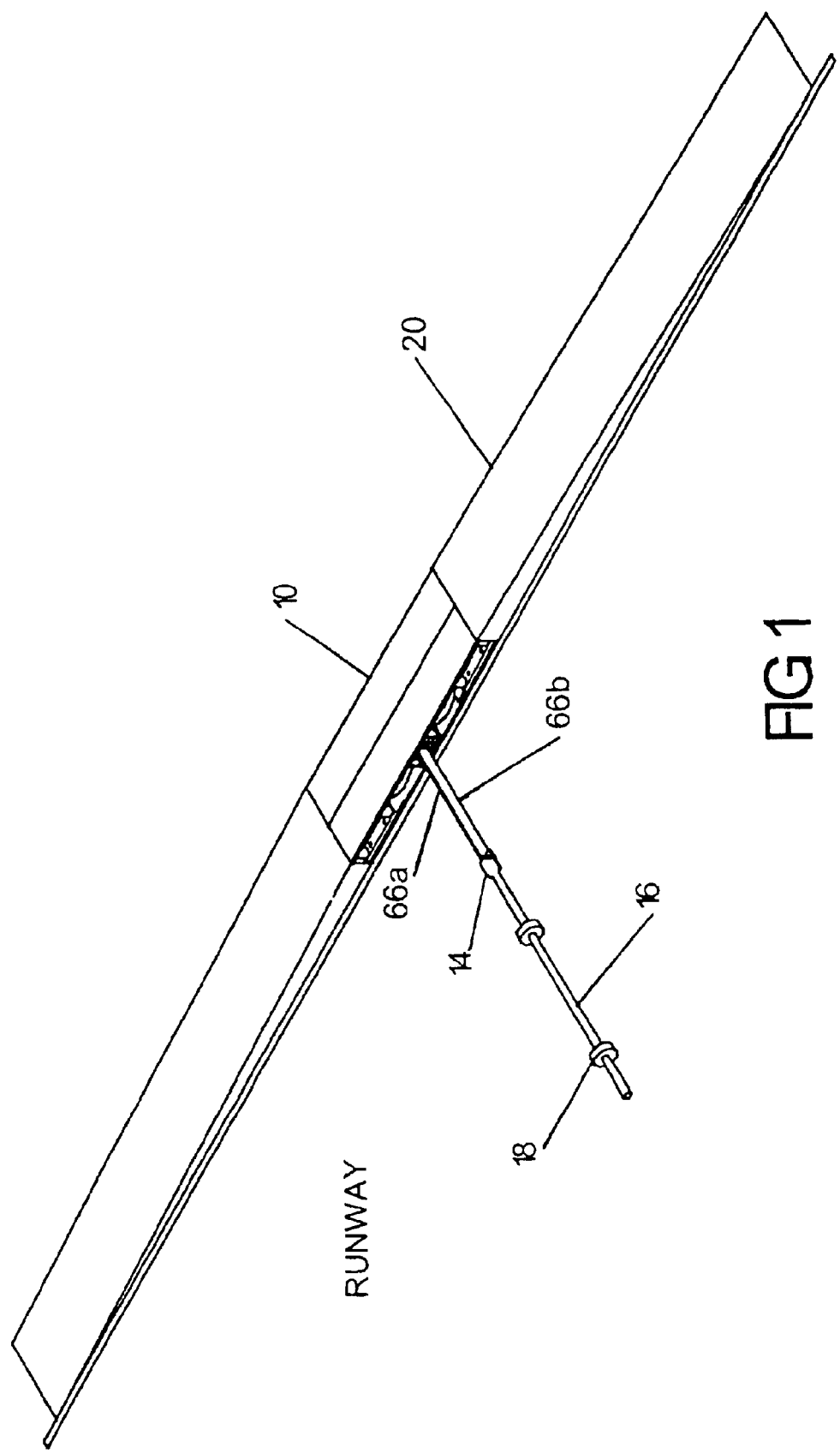
FIG. 1 is a view of an arresting system installed at the edge of a runway and attached to a tail-hook cable crossing the runway.

FIG. 1 is an overview of an arresting system 10 in accordance with the invention, which is illustrated as being installed along the edge of a runway surface. Arresting tapes 66a and 66b extending from system 10 are attached, via coupling device 14, to a tail-hook cable 16 positioned transverse to the runway. As shown, cable 16 is supported above the runway surface by disks 18, of rubber or other suitable material, to facilitate engaging of the cable by the tail hook of an aircraft whose forward motion along the runway is to be arrested.

The vertical height of the arresting system as shown in FIG. 1 may be one foot or less, so as to meet relevant airport regulations controlling the height of objects permitted to be positioned at the runway edge as shown. In FIG. 1, 20 represents a raised portion of earth or other suitable material positioned contiguous to arresting system 10 and including inclined ramp portions. With such configuration, the wheels of an aircraft which leave the runway surface can safely run along portion 20 and overrun arresting system 10, while avoiding damage to either the aircraft or the arresting system. As will be described, removable cover panels of arresting system 10 may be provided in the form of aluminum aircraft landing pads, of a type available for use in providing temporary landing surfaces, or of other suitable construction. In applications in which in-ground installation is appropriate, the limited system height is compatible with shallow excavation. The cover panels may be positioned at ground level, with aircraft overrun permitted as necessary.

For reference, the arresting system as in FIG. 1 may, for example, provide capabilities for arrestment of an aircraft traveling at a speed of 190 knots with a kinetic energy of 50 million foot-pounds or more. As will be described, in accordance with the invention single-use arresting tapes are employed in the FIG. 1 system, which is arranged to facilitate removal and replacement of tape spools following an aircraft arrestment.

Figure 2:
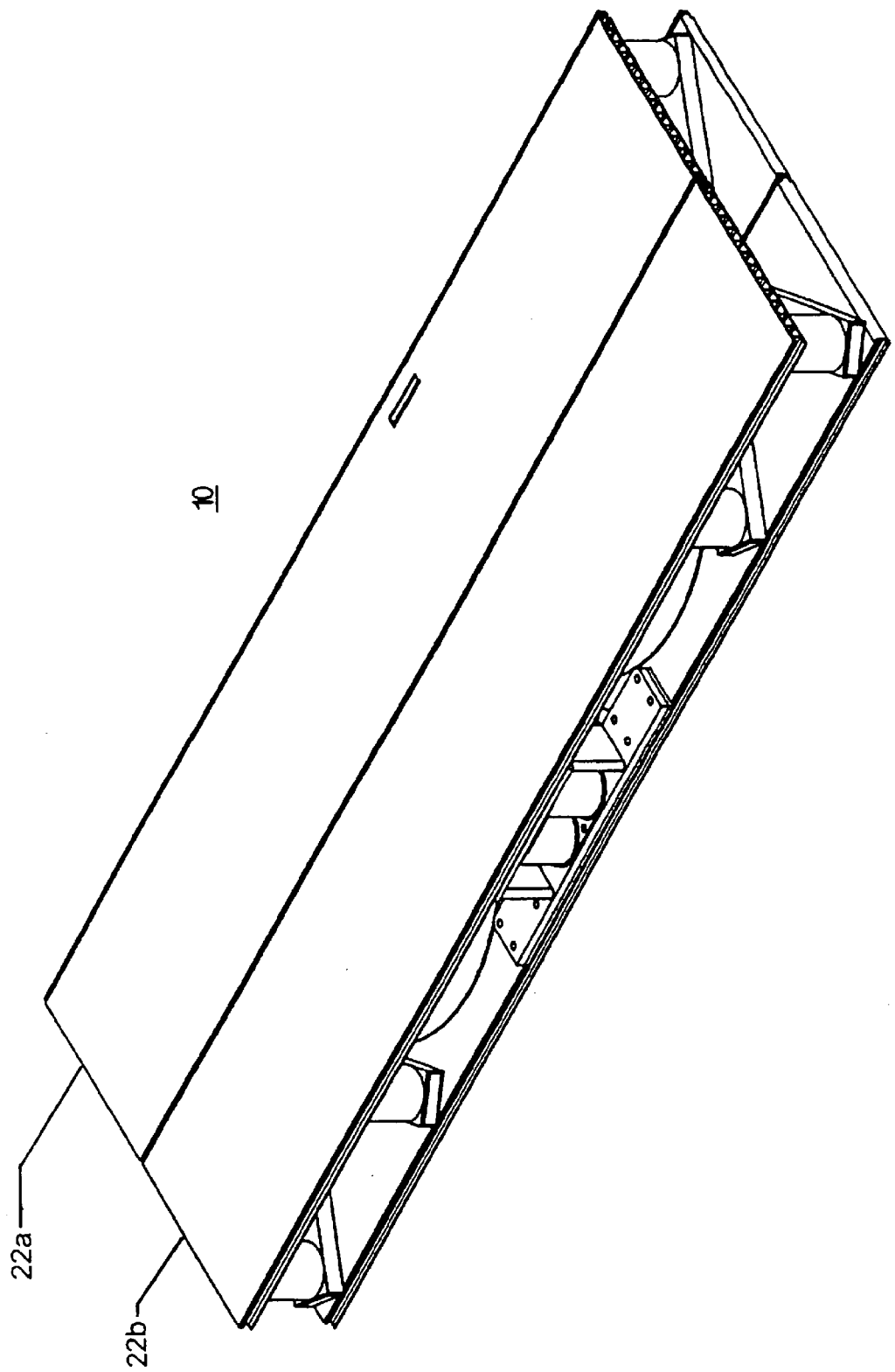
FIG. 2 is a further view of the arresting system of FIG. 1.

FIG. 2 shows the arresting system 10 of FIG. 1 with top panels 22a and 22b in place. Approximate dimensions of this embodiment of system 10 may be 3.6 meters in length, 1.2 meters in width and 0.3 meters in height. In the figures, dimensions are not necessarily to scale, but may be distorted for purposes of clarity of illustration.

Figure 3:
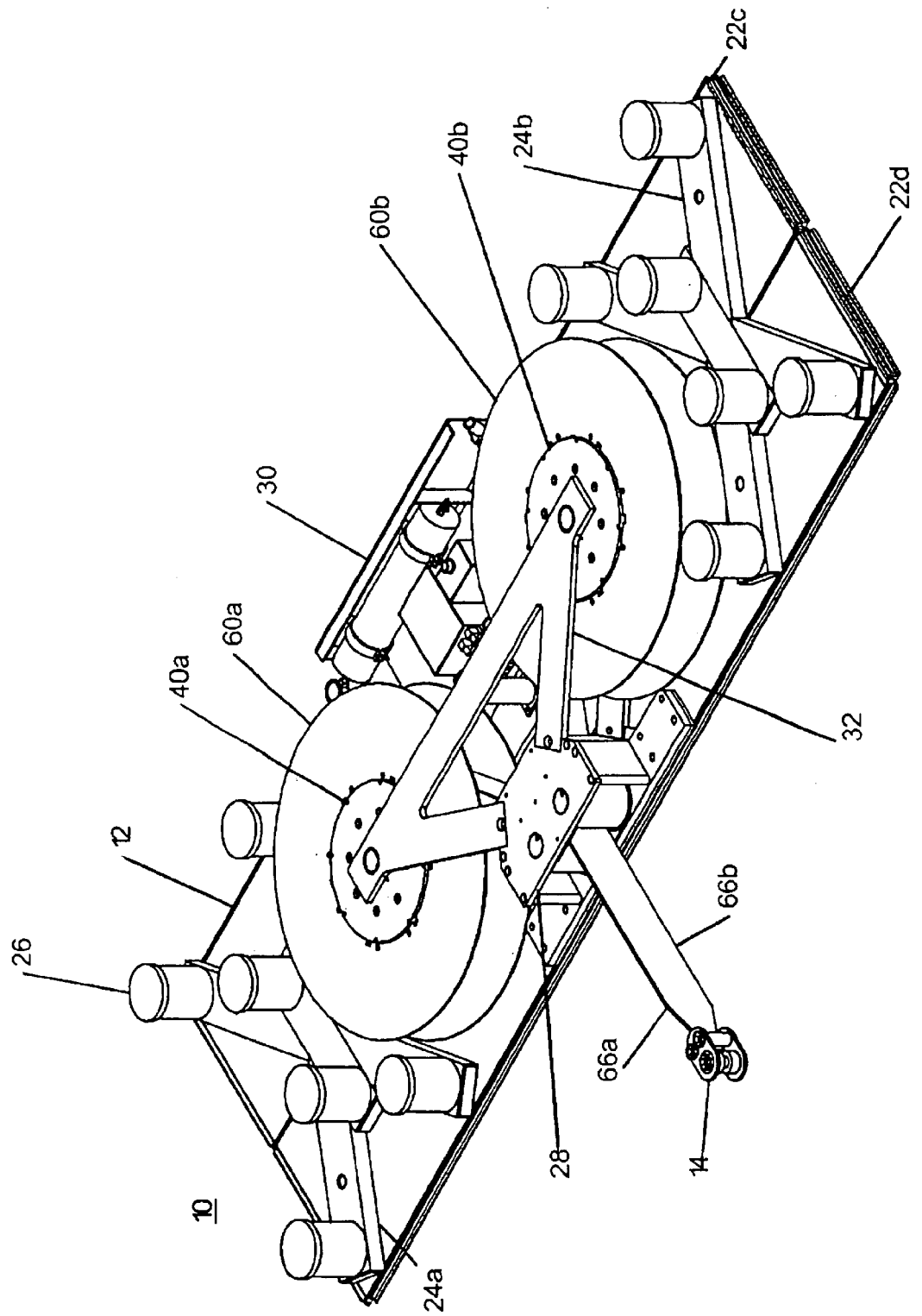
FIG. 3 shows the arresting system with top panels removed.

FIG. 3 is a view of arresting system 10 of FIGS. 1 and 2 with the top panels removed. As shown, the system includes a support assembly, brake assemblies, tape spools and other components and subsystems to be described.

The support assembly 12 includes base panels 22c and 22d, which may be aircraft landing pads or of other suitable construction. In the configuration shown, interconnecting structural elements in a crossed configuration are employed to provide structural X-frames 24a and 24b. These X-frames are combined with a plurality of columnar support members, as represented by support member 26, which provide support for the upper cover panels 22a and 22b and effectively transfer vertical forces directly to the underlying surface supporting the arresting system 10. Additional support for the cover panels is provided by constructing the structural members associated with operational portions of the arresting system (e.g., tape run-out roller assembly 28 and hydraulic subsystem enclosure 30) to provide sufficient strength to support the cover panels and transfer forces to the underlying surface during an aircraft rollover and in other circumstances. Cover panels 22a and 22b may be fastened to upper portions of the support assembly (e.g., via bolts or other suitable arrangement) in a manner facilitating removal for replacement of tape spools or other service or maintenance activities.

The FIG. 3 arresting system includes first and second brake assemblies 40a and 40b, which are mounted to the support assembly base panels 22c and 22d. At the top, each brake assembly is mechanically coupled to upper support member 32, which is removably attached to the enclosure 28. As shown, each brake assembly is positioned within the hub of one of the respective tape spools 60a and 60b to be further described. With this construction, the height of a brake assembly is not additive to the height of the associated tape spool. Removal of upper support member 32 enables removal and replacement of tape spools 60a and 60b.

Figure 4:
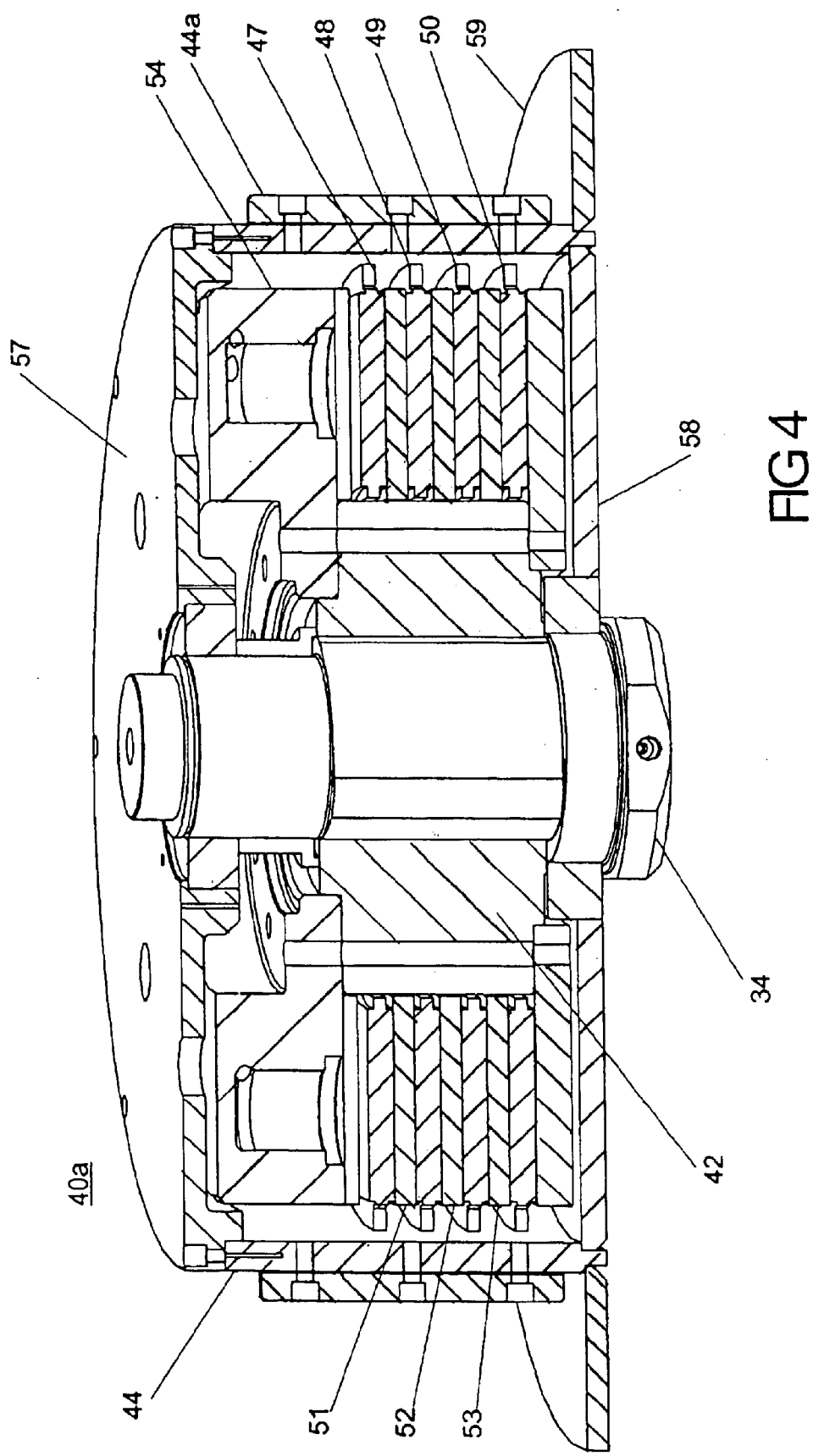
FIG. 4 is a sectional view of a brake assembly shown in FIG. 3 positioned within the hub of a tape reel of the arresting system.
Figure 5:
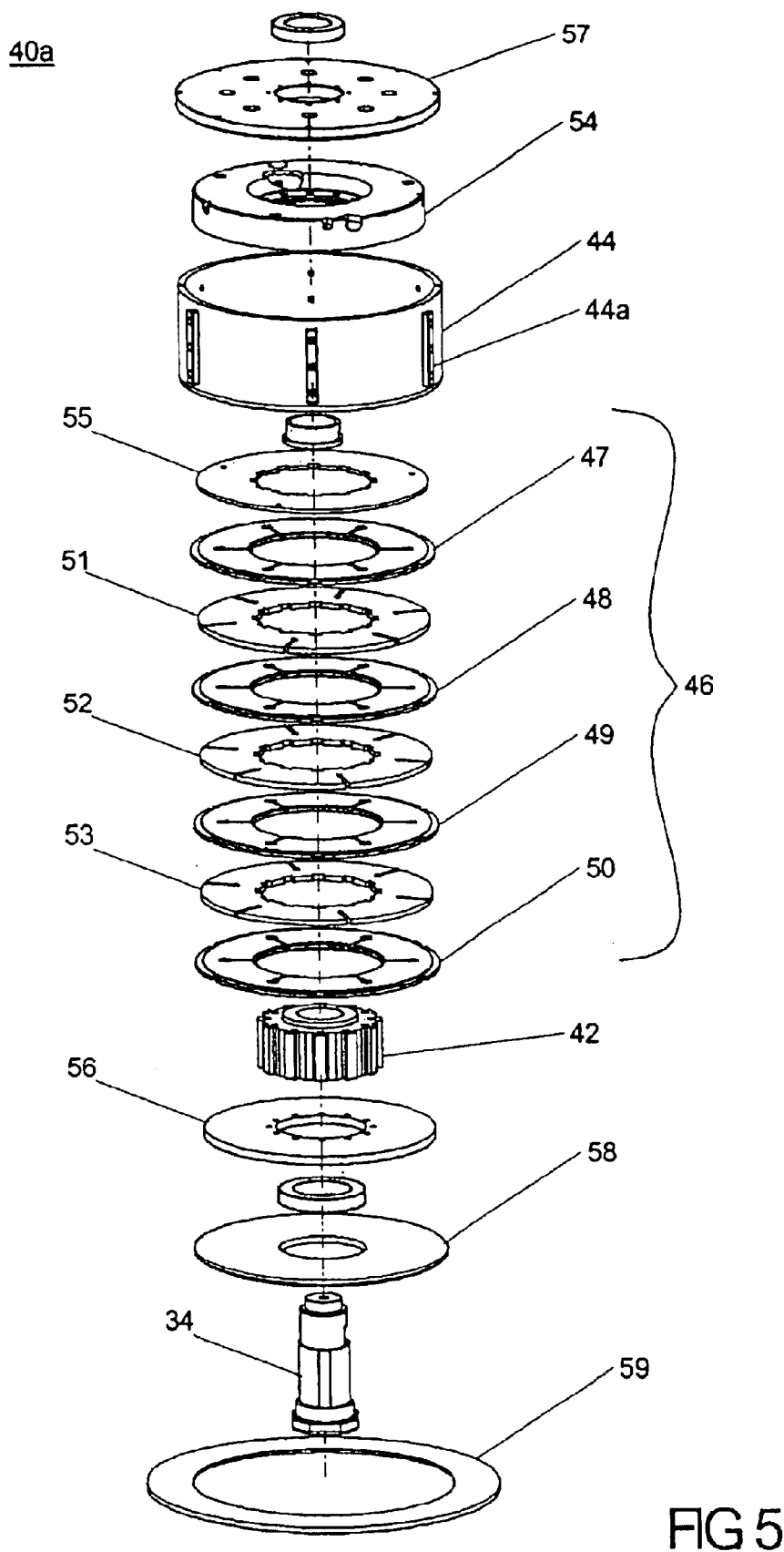
FIG. 5 is an expanded view of components of the brake assembly of FIG. 4.

Brake assembly 40a is shown in sectional view in FIG. 4. Brake assembly 40b as included in FIG. 3 is identical to assembly 40a. Basic components of this configuration of brake assembly 40a are further illustrated in the expanded view of FIG. 5. Vertically aligned support shaft 34 is part of the support assembly 12 and is mounted to the base of the support assembly. Brake assembly 40a includes a stationary portion 42, shown as an annular core member, supported by support shaft 34. Support shaft 34 may have a basically triangular horizontal cross section to cooperate with a correspondingly shaped inner shape of stationary portion 42 to prevent its rotation relative to shaft 34. Brake assembly 40a also includes a rotatable portion 44, shown as an annular external shell member, which is configured to support tape spool 60a, as will be further described.

Coupled between stationary portion 42 and rotary portion 44, brake assembly 40a includes a braking mechanism 46, shown as comprising rotor disks 47, 48, 49, 50 and interspersed stator disks 51, 52, 53. In this configuration, the rotor disks 47–50 are keyed at their outer circumference to the inner surface of rotatable portion 44, so as to rotate with rotation of portion 44. Interspersed stator disks 51–53 are keyed at their inner circumference to the outer surface of stationary portion 42, to prevent their rotation. Rotor disks 47–50 are provided with frictional surface linings and stator disks 51–53 are provided with steel wear surfaces. Not specifically shown in the drawings are hydraulic system elements, including components positioned under hydraulic subsystem enclosure 30 and which may include small pistons in the base of the brake assembly. Such a piston arrangement may be employed to enable application of hydraulic pressure to compress together the disks 47–53 between upper and lower pressure disks 55 and 60. Application of hydraulic pressure for this purpose may be suitably computer controlled in order to provide appropriate braking forces for effective aircraft arrestment. Brake assembly 40a may additionally include a cap portion 54, a cover 57, base ring 58, base flange 59, and other elements suitable for operationally positioning and maintaining brake assembly 40a and its components in position on support shaft 34. In other embodiments brake assemblies and constituent components may be employed as determined by skilled persons as appropriate to particular applications.

It will thus be seen that, with internal elements of brake assembly 40a non-rotationally supported by the support assembly 12, via support shaft 34, and external elements including shell portion 44 rotatable, rotation of rotatable portion 44 can be controllably braked by frictional engagement of rotor disks 47–50 with stator disks 51–53. It will further be seen that with construction of this type, the braking mechanism 46 is positioned within a spool hub when the arresting system is assembled as in FIG. 3 and the tops of the brake mechanisms and tape spools are all at nominally the same height.

Brake configurations utilizing friction between rotor and stator disk arrangements have previously been employed in aircraft arresting systems. However, in known prior systems the brake components have been positioned externally to a tape spool (e.g., side-by-side, with axes of rotation aligned horizontally) with mechanical coupling between a rotatable tape spool and rotatable elements of the brake which were internal to the brake. A prior configuration of this type is described in the "Operations Manual for the BAK-12 Energy Absorber", September, 1994, as provided by the assignee of the present invention and the following pages of which are hereby incorporated by reference: cover, 1—1, 1–2 and 2–1 through 2–10. Views of a complete prior system are provided in FIG. 1.1 thereof and brake assembly details are provided in FIG. 2.5. While operationally effective, the BAK-12 unit does not provide a low-profile configuration usable in an above-ground installation along the edge of a runway.

Figure 6:
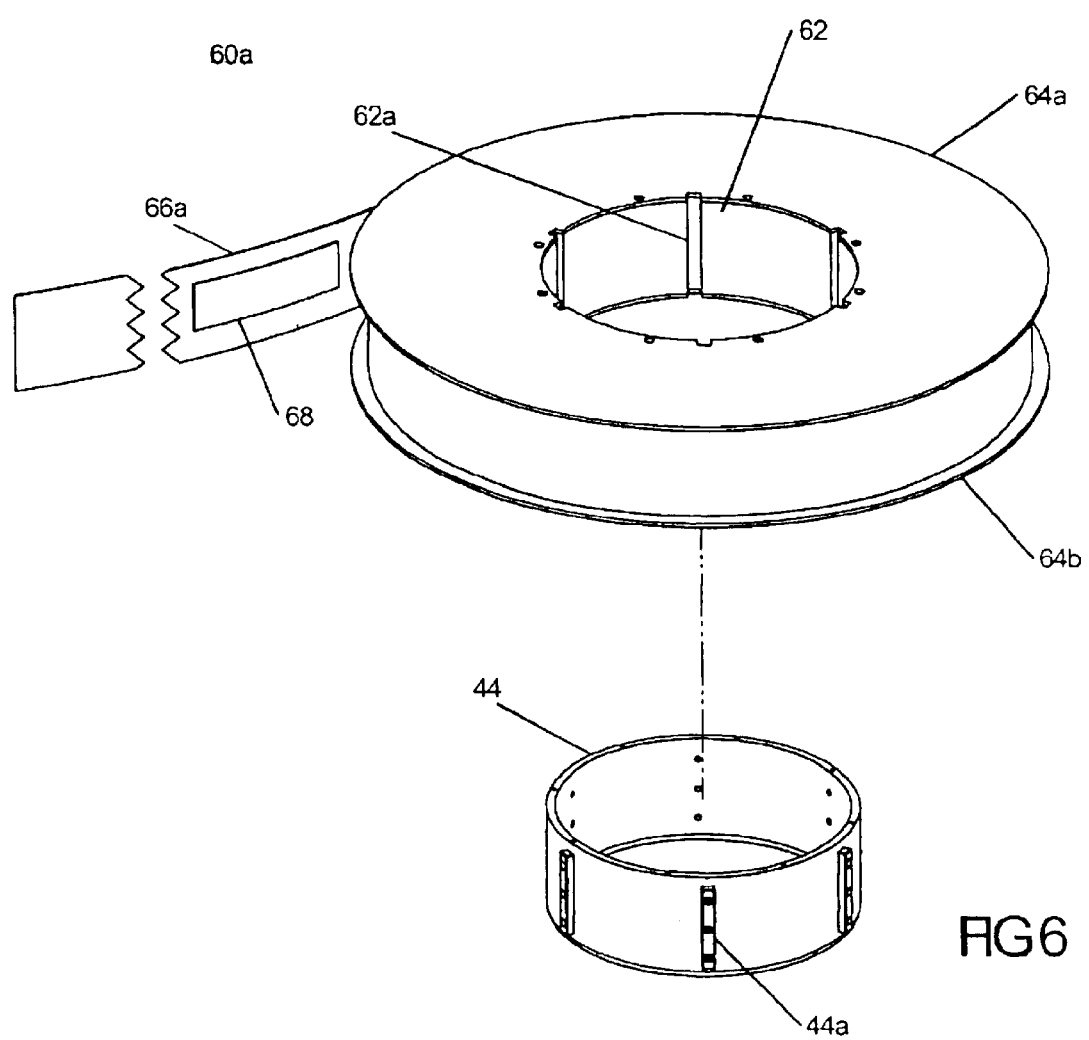
FIG. 6 is a sectional view of a tape reel of the FIG. 3 arresting system.

A first tape spool 60a of FIG. 3 is shown in more detail in FIG. 6. Second tape spool 60b as included in FIG. 3 is identical to tape spool 60a. As shown, first tape spool 60a includes a spool hub 62 to which are attached spool flanges 64a and 64b. Flanges 64a and 64b are identical, so that tape spool 62 may be installed with either flange as the top flange, depending upon whether tape deployment with clockwise or counter-clockwise spool rotation is desired, as will be further discussed. The spool components may be formed of steel or other suitable material and may be fastened together by screws or otherwise fabricated in one or more pieces. In the illustrated embodiment, spool hub 62 includes internal keying features, shown as vertical grooves 62a, which are configured to cooperate with external keying features of rotatable portion 44 of the brake assembly 40a. The view of rotatable portion 44 included in FIG. 6 illustrates external ridges 44a dimensioned to mate with the grooves 62a.

With this keying configuration, spool hub 62 can be slideably positioned around rotatable portion 44. When in position the tape spool and rotatable portion are in fixed rotatable relation, so that any rotation of the tape spool during tape deployment for aircraft arrestment will produce accompanying rotation of the rotatable portion of the brake assembly. Correspondingly, braking of rotatable portion 44 will produce braking of tape spool 60a. This construction enables tape spool 60a to be slideably installed on and removed from support by the brake assembly 40a for replacement of the tape spool after an aircraft arrestment. In other embodiments different keying configurations can be employed for the spool hub 62 and rotatable portion 44 to provide a fixed rotational relation, the tape spool can be fastened in position by removable screws or bolts, or other suitable provision can be made to position the tape spool for support by the rotatable portion of a brake assembly.

In FIG. 6, tape spool 60a also includes an arresting tape 66a wound on spool hub 62. Tape 66a may be of flat woven construction, of polyester or other suitable material, of the order of six inches wide, one-tenth inch thick and 800 feet in length or of other suitable dimensions and construction. The tape strength and other physical dimensions and characteristics can be specified by skilled persons, once having an understanding of the invention, in view of desired implementation factors including runway width, weight of aircraft to be arrested, and other pertinent factors.

In a presently preferred embodiment, the tape 66a is pre-tensioned when wound on spool hub 62, in order to avoid or mitigate slack conditions when an aircraft tail hook engages the tail-hook cable and thereby initiates arresting tape deployment. To maintain the arresting tape on a tape spool in a pre-tensioned condition prior to tape deployment and to readily enable tape deployment when appropriate, an adhesion element 68 may be positioned between at least a portion of a layer of the arresting tape and an underlying layer of the tape as wound on the tape spool. As represented in FIG. 6, adhesion element 68 may be a patch of fabric or other material of suitable size, shape and thickness and bearing an adhesive substance on each main surface. With element 68 positioned as shown and covered by one or more layers of the wound tape, it is held in place and effective to maintain the pre-tensioned condition for the preceding windings of the tape. While the degree of pre-tensioning desirable may depend on tape stretch coefficients and other factors, a pre-tension of the order of one to two thousand pounds tangential pull may be effective for present purposes. The degree of adhesion and separability of the layers of the arresting tape and the characteristics and quantity and type of adhesive substance can be determined by skilled persons in view of operational parameters in particular implementations. As an example, an acrylic laminating adhesive, such as Adhesive 468 manufactured by 3M Corporation, may be used.

As discussed, the arresting system utilizes tape spools on a one-time basis, with removal and replacement of tape spools after each aircraft arrestment. Removal and replacement may also be desirable after an extended period of non-use of the system. Accordingly, the illustrated tape spool design is considered to provide a reliable tape spool of economical construction which enhances ease of installation and removal. With an understanding of the invention, skilled persons may provide different or variant tape spool configurations as appropriate for particular implementations of the invention.

As described, the arresting system of FIG. 3 includes dual, tape spool configurations, with the tape spool circumferences spaced horizontally and with spaced nominally parallel axes of rotation each aligned nominally vertically. For present purposes, "nominally" is defined as having a value or relationship within plus or minus twenty percent of a stated value or relationship.

As shown, the arresting tape of tape spools 60a and 60b of FIG. 3 leaves the spools in a mirror-image relation, so that when an aircraft tail hook engages tail-hook cable 16, coupling device 14 pulls the arresting tapes from both tape spools 60a and 60b simultaneously. This causes tape spool 60a to rotate clockwise and tape spool 60b to rotate counter-clockwise. To accommodate this, the tape spools are constructed to permit installation with either one of the spool flanges 64a or 64b of FIG. 6 as the top flange. At installation, the tape spools can thus be flipped over as appropriate to achieve the tape exit relationship as illustrated in FIG. 3, whereby the two arresting tapes can be fed out through the tape run-out rollers of assembly 28 in parallel side-by-side contiguous relationship.

Figure 7:
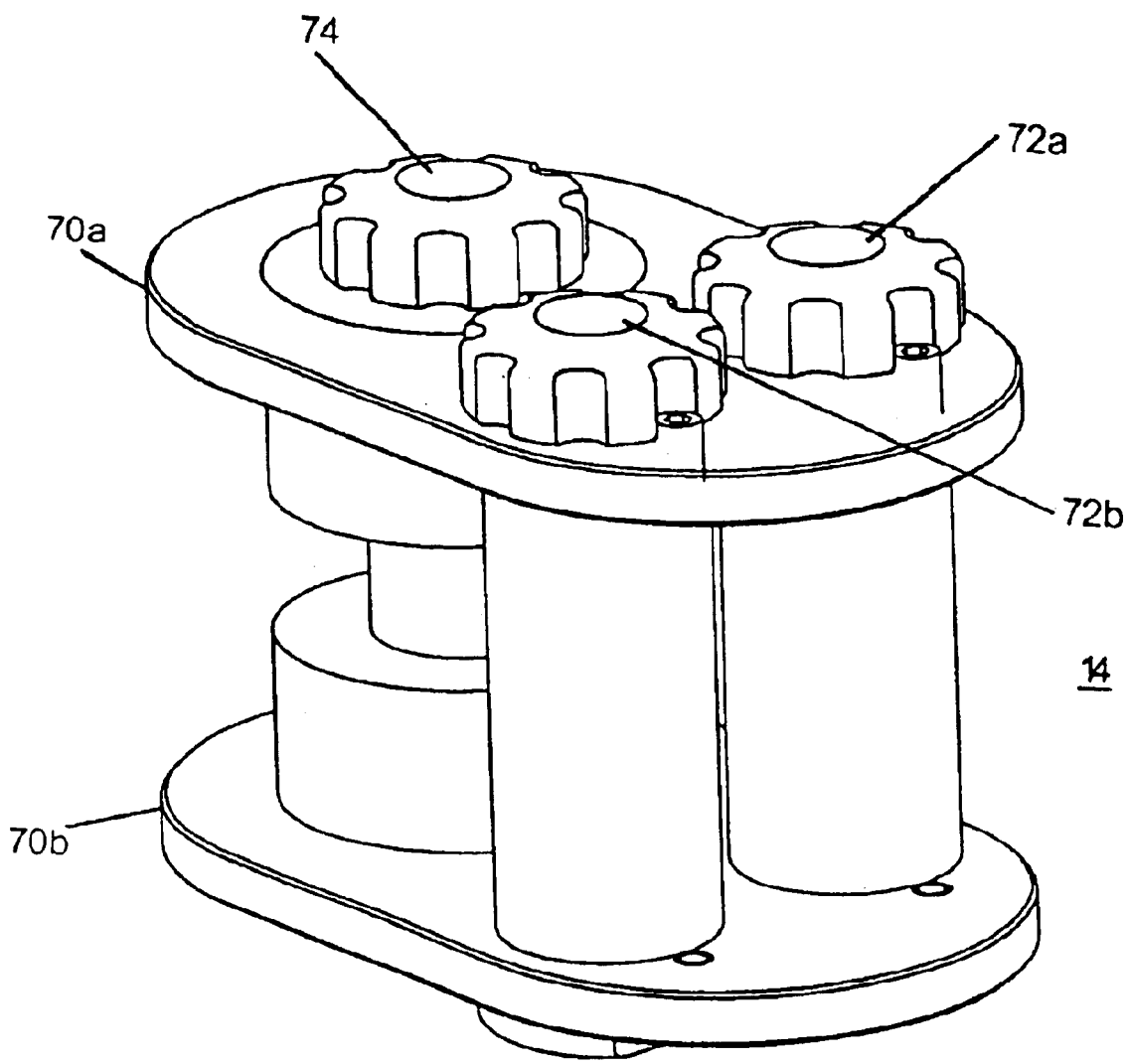
FIG. 7 shows the tail-hook cable/arresting tape coupling device as included in the arresting system of FIG. 3.

FIG. 7 illustrates an embodiment of coupling device 14, which is shown in FIGS. 1 and 3 attached to one end of the arresting tape of each of first and second tape spools 60a and 60b, to enable attachment to an aircraft engagement unit, shown in FIG. 1 as tail-hook cable 14. In the FIG. 7 embodiment, coupling device 14 includes top and bottom plates 70a and 70b configured to retain two arresting tape attachment pins 72a and 72b and tail-hook cable attachment pin 74. As shown, coupling device 14 includes additional spacer cylinders and threaded retainers. In other configurations, coupling device 14 may be of any suitable form, construction and material as appropriate to detachably connect the three elements and provide adequate strength in a particular application of the invention. In use, the ends of the arresting tapes of tape spools 60a and 60b are fastened around the respective tape attachment pins 72a and 72b and the end of the tail-hook cable is fastened around attachment pin 74. In this embodiment, coupling device 14 is constructed to permit removal of threaded retainers positioned on the tops of the pins to permit removal of top plate 70a to enable pre-formed tape and cable end loops to be placed over respective attachment pins and secured in place by replacement and securing of top plate 70a.

Other components and assemblies of the FIG. 3 arresting system include the tape run-out roller assembly 28 and a hydraulic subsystem indicated at 30. Assembly 28 may include tape-handling rollers arranged so that when tape deployment occurs the two tapes 66a and 66b are deployed in side-by-side parallel contiguous relationship as represented in FIG. 3. Subsystem 30 is arranged to enable controlled application of hydraulic pressure to the first and second brake assemblies 40a and 40b for braking of rotation of the first and second tape spools 60a and 60b in a coordinated manner, which may be computer controlled for effective aircraft arrestment. In this regard, sensors may be employed to monitor rotation of the tape rollers in assembly 28, to provide data for use in deriving indications as to aircraft position and velocity usable for computer control. These and other aspects of an arresting system utilizing the invention may be implemented by skilled persons in view of the preceding description and the description provided in the above noted U.S. Pat. No. 5,042,750 and BAK-12 Operations Manual, the disclosures of which are incorporated herein by reference.

The above description is provided in the context of an aircraft arresting system. The invention may also be employed in a wide variety of other applications in which it is desirable to arrest travel of a moving object, particularly when it is desirable to do so under controlled and non-destructive conditions. The low over-all system height (e.g., one foot or less) provides added applicational utility, as compared to prior systems which provided arrestment capability, but were of much greater height, bulk and cost. Thus, in automotive and race car applications, the one-foot height may be earth-banked in above-ground installations or require only shallow provision for below-ground installations. For emergency activation applications, the use of one-time replaceable tape spools and avoidance of inclusion of a rewind engine and related mechanisms enables reduced cost implementation, as compared to prior systems.

System construction, as described, facilitates field assembly and disassembly of a system for temporary use at remote landing sites. In particular, the X-frame construction enables provision of siting arrangements permitting systems to be securely positioned above-ground with known types of ground-anchoring elements, so as to avoid a requirement for poured concrete support facilities.

While there have been described the currently preferred embodiments of the invention, those skilled in the art will recognize that other and further modifications may be made without departing from the invention and it is intended to claim all modifications and variations as fall within the scope of the invention.

What is claimed is:

1. An arresting system, for aircraft arrestment, comprising:

a support assembly;

a first brake assembly supported by the support assembly and including a stationary portion, a first rotatable portion configured to support a first tape spool rotatable about a nominally vertical axis and a braking mechanism to brake rotation of the first rotatable portion;

a second brake assembly supported by the support assembly in horizontally spaced relation to the first brake assembly, the second brake assembly including a stationary portion, a second rotatable portion configured to support a second tape spool rotatable about a nominally vertical axis and a braking mechanism to brake rotation of the second rotatable portion;

first and second tape spools removably supported by the respective first and second rotatable portions, each tape spool including a spool hub configured to encircle and rotate with the respective rotatable portion and an arresting tape wound on the spool hub;

each said arresting tape comprising a length of tape wound in successive layers on the spool hub under tension with at least a portion of a tape layer detachably adhered to an underlying tape layer to maintain the arresting tape in a pre-tensioned condition prior to tape deployment and permit separation of tape layers during deployment, said portion detachably adhered having a length equal to only a small percentage of said length of tape; and a coupling device attached to one end of the arresting tape of each of the first and second tape spools to enable attachment to an aircraft engagement unit positionable transverse to a runway.

2. An arresting system as in claim 1, wherein each of the first and second rotatable portions is positioned within a respective one of the spool hubs of the first and second tape spools.

3. An arresting system as in claim 1, wherein the braking mechanisms and tape spools are configured so that the tops of the first and second brake mechanisms and the tops of the first and second tape spools are all at nominally the same height.

4. An arresting system as in claim 1, wherein each braking mechanism comprises rotor disks configured to rotate with the rotatable portion and stator disks configured to maintain fixed rotational relation to the stationary portion, the rotor disks and stator disks intermixed and arranged for frictional engagement to provide braking.

5. An arresting system as in claim 1, wherein each tape spool is configured for one-time use and requires replacement after each aircraft arrestment and each spool hub includes internal keying features to cooperate with external keying features of a respective rotatable portion of a brake assembly to cause the rotatable portion to rotate with tape spool rotation and to enable slidable removal of the spool hub from said rotatable portion for replacement after an aircraft arrestment.

6. An arresting system as in claim 1, wherein each of the first and second tape spools is positioned for rotation about a respective axis of rotation and the tape spools are supported in horizontally spaced relation with their axes of rotation in nominally parallel, nominally vertical alignment.

7. An arresting system as in claim 1, wherein the tape spools are configured for slidable removal from the respective rotatable portions.

8. An arresting system as in claim 7, wherein the support assembly includes a removable upper support member configured to permit removal and replacement of the tape spools.

9. An arresting system as in claim 1, wherein said portion detachably adhered to an underlying tape layer has a length not exceeding the length of one said layer.

10. An arresting system as in claim 1, wherein each tape spool is configured for one-time use, with tape spool removal and replacement after use for an aircraft arrestment.

11. An arresting system as in claim 1, wherein each tape spool is configured for one-time use and the arresting system includes no mechanism for rewinding an arresting tape after tape deployment for aircraft arrestment.

12. An arresting system as in claim 1, wherein the support assembly includes internal columnar supports supporting flat panel cover units suitable to permit unimpeded overrun of the arresting system by wheels of an aircraft.

13. An arresting system as in claim 12, wherein the flat panel cover units are aluminum units designed for aircraft landing surface applications.

14. An arresting system as in claim 1, wherein the support assembly includes internal columnar supports and interconnecting structural elements in a crossed configuration arranged to provide distribution of forces occurring during deployment of arresting tapes for aircraft arrestment and forces occurring during overrun of the arresting system by wheels of an aircraft.

15. An arresting system, comprising:

a support assembly;

a brake assembly supported by the support assembly and including a stationary portion, a rotatable portion configured to support a tape spool and a braking mechanism to brake rotation of the rotatable portion; and a tape spool removably supported by the rotatable portion and including a spool hub configured to encircle and rotate with the rotatable portion and an arresting tape wound on the spool hub;

said arresting tape comprising a length of tape wound in successive layers on the spool hub under tension with at least a portion of a tape layer detachably adhered to an underlying tape layer to maintain the arresting tape in a pre-tensioned condition prior to tape deployment and permit separation of tape layers during deployment, said portion detachably adhered having a length equal to only a small percentage of said length of tape;

the braking mechanism configured to be positioned at least partially within the spool hub when the tape spool is removably supported by the rotatable portion.

16. An arresting system as in claim 15, wherein the tape spool is rotatable about an axis of rotation for deployment of the arresting tape for arrestment use and said axis of rotation has a nominally vertical alignment when the tape spool is removably supported by the rotatable portion.

17. An arresting system as in claim 15, wherein the braking mechanism is positioned within the spool hub when the tape spool is removably supported by the rotatable portion.

18. An arresting system as in claim 15, wherein the tape spool is configured for one-time use and requires replacement after an aircraft arrestment and the spool hub includes internal keying features which cooperate with external keying features of the rotatable portion to cause the rotatable portion to rotate with rotation of the tape spool and to enable slidable removal of the spool hub from said rotatable portion of the brake assembly for replacement after an aircraft arrestment.

19. An arresting system as in claim 15, wherein said portion detachably adhered to an underlying tape layer has a length not exceeding the length of one said layer.

20. An arresting system as in claim 15, wherein the tape spool is configured for slidable removal from the rotatable portion.

21. An arresting system as in claim 15, wherein the tape spool is configured for one-time use, with tape spool removal and replacement after tape deployment for arrestment use.

22. An arresting system as in claim 15, wherein the arresting system is configured for one-time use of a tape spool and includes no mechanism for rewinding an arresting tape after tape deployment for arrestment use.

23. A tape spool, usable in an arresting system having a brake assembly including a rotatable portion configured to support the tape spool, comprising:

a spool hub configured to encircle the rotatable portion of the brake assembly and to be removably supported by the rotatable portion for rotation therewith; and a length of arresting tape wound on the spool hub in successive layers on the spool hub under tension with at least a portion of a tape layer detachably adhered to an underlying tape layer to maintain the arresting tape in a pre-tensioned condition prior to tape deployment and permit separation of tape layers during deployment, said portion detachably adhered having a length equal to only a small percentage of said length of tape.

24. A tape spool as in claim 23, additionally comprising:

an adhesion element positioned between at least a portion of a layer of the arresting tape and an underlying layer of the arresting tape wound on the spool hub;

the adhesion element arranged to maintain the arresting tape in a pre-tensioned condition prior to tape deployment and permit tape deployment for arrestment use.

25. A tape spool as in claim 24, wherein the adhesion element comprises a patch of material bearing an adhesive on each main surface.

26. A tape spool as in claim 24, wherein the adhesion element comprises a quantity of an adhesive.

27. A tape spool as in claim 23, wherein the rotatable portion of the brake assembly includes external keying features and the spool hub includes internal keying features, the keying features configured to cooperate to enable removable installation of the tape spool in fixed rotational relation to the rotatable portion.

28. A tape spool as in claim 23, wherein the tape spool is configured for one-time use and requires replacement after an aircraft arrestment and the hub of the tape spool is configured to be slideably positioned around the rotatable portion of the brake assembly, to enable slideable installation and slideable removal of the tape spool for replacement after use.

29. A tape spool as in claim 23, wherein the arresting tape is a woven tape of flat flexible type construction.

* * * * *